US007960071B2

(12) United States Patent
Oh et al.

(10) Patent No.: US 7,960,071 B2
(45) Date of Patent: Jun. 14, 2011

(54) SEPARATOR FOR FUEL CELL USING A METAL PLATE COATED WITH TITANIUM NITRIDE, METHOD FOR MANUFACTURING THE SAME, AND POLYMER ELECTROLYTE MEMBRANE FUEL CELL COMPRISING THE SEPARATOR

(75) Inventors: In-Hwan Oh, Seoul (KR); Eun Ae Cho, Seoul (KR); Sung-Goon Kang, Seoul (KR); Ui Sik Jeon, Seoul (KR); Heung Yong Ha, Seoul (KR); Seong Ahn Hong, Seoul (KR); Tae Hoon Lim, Seoul (KR); Suk-Woo Nam, Seoul (KR); Sung Pil Yoon, Kyunggi-do (KR); Jonghee Han, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 819 days.

(21) Appl. No.: 11/011,589

(22) Filed: Dec. 13, 2004

(65) Prior Publication Data
US 2005/0214618 A1   Sep. 29, 2005

(30) Foreign Application Priority Data

Mar. 23, 2004   (KR) .................. 10-2004-0019751

(51) Int. Cl.
*H01M 4/64* (2006.01)
*H01M 4/66* (2006.01)
(52) U.S. Cl. ........ 429/519; 429/517; 429/518; 429/520; 429/521; 429/522

(58) Field of Classification Search .............. 429/12–46, 429/34–39
See application file for complete search history.

(56) References Cited

U.S. PATENT DOCUMENTS

| 5,683,828 | A | * | 11/1997 | Spear et al. ................. 429/13 |
| 5,776,624 | A | * | 7/1998 | Neutzler ..................... 429/26 |
| 6,051,331 | A | * | 4/2000 | Spear et al. ................. 429/34 |
| 6,255,012 | B1 | * | 7/2001 | Wilson et al. ................ 429/38 |
| 2003/0146378 | A1 | * | 8/2003 | Mordehai ..................... 250/288 |

FOREIGN PATENT DOCUMENTS

| JP | 09-225677 | 9/1997 |
| JP | 10-507573 | 7/1998 |

(Continued)

OTHER PUBLICATIONS

Prater, Keith B., "Solid polymer fuel cells for transport and stationary applications", Journal of Power Sources 61(1996) 105-109.

(Continued)

*Primary Examiner* — Dah-Wei D Yuan
*Assistant Examiner* — Steven Scully
(74) *Attorney, Agent, or Firm* — Merchant & Gould P.C.

(57) ABSTRACT

Disclosed is a separator for a fuel cell made of a metal plate comprising both a cooling water flow field and a gas flow field formed on each surface thereof, wherein the separator consists of the joined metal plates for the cooling water flow fields to face each other, the surfaces of the joined metal plates are coated with TiN, a polymer electrolyte membrane fuel cell comprising the separator and a method for manufacturing the separator.

6 Claims, 3 Drawing Sheets

FOREIGN PATENT DOCUMENTS

| | | |
|---|---|---|
| JP | 10-308227 | 11/1998 |
| JP | 2000-048833 | 2/2000 |
| JP | 2000-113897 | 4/2000 |
| JP | 2000-353531 | 12/2000 |
| JP | 2001-196080 | 7/2001 |
| JP | 2002-224832 | 8/2002 |
| JP | 2003-123781 | 4/2003 |
| JP | 2003-197223 | 7/2003 |
| KR | 2003-0049805 | 6/2003 |
| WO | WO 96/37005 | 11/1996 |

OTHER PUBLICATIONS

Davies, et al., "Stainless steel as a bipolar plate material for solid polymer fuel cells", Journal of Power Sources 86 (2000) 237-242.

Wang, et al. "Stainless steel as bipolar plate material for polymer electrolyte membrane fuel cells", Journal of Power Sources 115 (2003) 243-251.

Makkus, et al., "Use of stainless steel for cost competitive bipolar plates in the SPFC", Journal of Power Sources 86 (2000) 274-282.

Kim, et al., "Effect of alloying elements on the contact resistance and the passivation behavior of stainless steels", Corrosion Science 44 (2002) 635-655.

Brady, et al., "Metallic Bipolar Plates", 2002 National Laboratory R&D Meeting DOE Fuel Cells for Transportation Program Golden, CO May 9, 2002.

Hornugn, et al., "Bipolar plate materials development using Fe-based alloys for solid polymer fuel cells", Journal of Power Sources 72 (1998) 20-21.

Davies, et al., "Bipolar plate materials for solid polymer fuel cells", Journal of Applied Electrochemistry 30: 101-105,2000, (2000).

Murphy, et al, "Low-cost light weight high power density PEM fuel cell stack", Electrochemistry Acta, vol. 43, No. 24, pp. 3829-3840, 1998.

Wind, et al., "Metallic bipolar plates for PEM fuel cells", Journal of Power Sources 105 (2002) 256-260.

Kumar, et al., "Modeling of polymer electrolyte membrane fuel cell with metal foam in the flow-filed of the bipolar/end plates", Journal of Power Sources 5042 (2002) 1-9.

Hodgson, et al., "New lightweight bipolar plate system for polymer electrolyte membrane fuel cells", Journal of Power Sources 96 (2001) 233-235.

Cunningham, et al."New Materials and Procedures to Protect Metallic PEM Fuel Cell Bipolar Plates", Journal of The Electrochemical Society 149 (7) A905-A91 1(2002).

Hantall, et al., "New materials for polymer electrolyte membrane fuel cell current collectors", Journal of Power Sources 80 (1999) 235-241.

* cited by examiner

SEPARATOR FOR FUEL CELL USING A METAL PLATE COATED WITH TITANIUM NITRIDE, METHOD FOR MANUFACTURING THE SAME, AND POLYMER ELECTROLYTE MEMBRANE FUEL CELL COMPRISING THE SEPARATOR

BACKGROUND OF THE INVENTION

1. Field of the Invention

The present invention relates to a separator for fuel cells using a metal plate coated with TiN, a method for manufacturing the same and a polymer electrolyte membrane fuel cell comprising the separator, particularly to a separator for fuel cell using a metal plate coated with TiN, a method for manufacturing the same and a polymer electrolyte membrane fuel cell comprising the separator, wherein the separator exhibits an excellent electrical conductivity, corrosion resistance and firmness, particularly, is thin, light, easily-processed and economically excellent, compared to the prior art using graphite, and has no problem of a lifetime reduction due to the corrosion of metal separator caused by the electrolyte, contrary to the prior art using a metal separator.

2. Description of the Related Art

A fuel cell using a polymer membrane having proton exchange characteristic as an electrolyte includes, for example, a solid polymer electrolyte membrane fuel cell (SPEFC) and a direct methanol fuel cell (DMFC).

Such a polymer electrolyte membrane fuel cell has advantages of a high efficiency, high current density and output density, a short start-up time and a quick response to variations of load.

In particular, since the polymer electrolyte membrane fuel cell uses a polymer membrane as an electrolyte, electrolyte loss is not a concern, a methanol reformer can be employed, which is an established technology, and the cell is less sensitive to pressure variations of reacting gases.

In addition, the polymer electrolyte membrane fuel cell has a simple design and can be easily manufactured and various materials can be used for a main body of the fuel cell. Additionally, the fuel cell has high volumetric and gravimetric power density and can provide various ranges of output, compared to a phosphoric acid fuel cell that is operated by the same principle.

Accordingly, the polymer electrolyte membrane fuel cell can be applied to various fields, such as a power source of a zero emission vehicle, an residential power generator, a power source for a spaceship, a mobile power source and a power source for the military, etc.

The polymer electrolyte membrane fuel cell has a basic structure having a polymer electrolyte membrane, porous cathode and anode, which are covered with a noble metal catalyst, mounted to both sides around the membrane, and a separator installed to an outside of the electrodes.

The electrodes are prepared by applying a mixture of catalyst and a polymer electrolyte, i.e., ionomer to an upper part of porous carbon paper, which is water proof-treated, wherein a coating of a liquid polymer electrolyte is formed on the surface of the catalyst and thus a three-phase interface with platinum catalyst and the electrolyte is formed.

The catalyst layer is generally made of powder of platinum or carbon powders carried with platinum and ruthenium to maximize a surface area thereof. When applying the catalyst, a spraying method, a filtration and deposition method and a screen printing method, etc. are used.

A commercial electrolyte membrane is disposed between the cathode and the anode prepared as described above, and then they are hot-pressed under a certain pressure at a glass transition temperature ($T_g$) of the electrolyte membrane or higher, thereby providing MEA.

The separator supports the electrodes and distributes the reactant gases. It is also referred to as a bipolar plate or flow field plate. A gas flow field of a fuel electrode is formed on a surface of the separator and a gas flow field of an air electrode is formed on another surface of the separator.

Hydrogen, which is a fuel, enters the gas flow field of the anode and oxygen or air, which is an oxidizer, is introduced into the gas flow filed of the cathode. An electrical energy is generated on the electrodes by an electrochemical oxidation of the fuel gas introduced and an electrochemical reduction of the oxidizer introduced.

In addition, the separator provides flow fields for supplying the fuel and the oxidizer, functions as a current collector conducting electrons produced at the anode to the cathode, and removes water generated during an operation of the cell.

Additionally, the separator is a main body supporting the MEA and allows a stack to be formed. The separator used in the stack removes heat of reaction and thus functions as a cooling water flow filed for maintaining a temperature of the stack constantly.

The cooling water flow filed is formed in all separators used in the stack or only in a part of the separators. The separator having the cooling water flow field formed is supplied with the fuel at one side thereof and the oxidizer at the opposite side thereof, and the cooling water is supplied to the middle of the separator.

Herein, the separator is accomplished by joining two plates, each of which has a gas flow field on a surface thereof and a cooling water flow field on the other surface thereof, with the surfaces having the cooling water flow field being faced each other.

The separator prepared as described above should have a long lifetime and excellent electrical conductivity, corrosion resistance and firmness, and be thin, light, well-processed and inexpensive.

That is, the separator should supply humidified reacting gases, and remove water produced by an electrochemical reaction without fail. In addition, the separator should have corrosion resistance and excellent electrical conductivity for effectively transporting electrons being produced and be light while maintaining the strength.

In addition, the separator should be easily processed and handled and made of an inexpensive material and have a long lifetime for a commercialization. Further, in order to put the polymer electrolyte membrane fuel cell to a practical use, an economic efficiency should be improved through a retrenchment of cost of processing the separator. Further, the power density (power per unit volume) should be improved by reducing a thickness of the separator.

According to the prior art, the separator is mostly made of graphite, which exhibits excellent electrical conductivity and corrosion resistance.

However, since the graphite is fragile, it is difficult to handle the graphite. Accordingly, it is difficult to form the flow fields on the graphite surface by machining. In addition, since the graphite is partly gas-permeable, a certain thickness is required to prevent reacting gases from being mixed, resulting in an increase of a volume of the stack.

Further, in order to commercialize the polymer electrolyte membrane fuel cell, the fabrication cost of the stack should be reduced to 1/100 or less. Currently-used graphite separators occupy about 60% of the stack cost. Accordingly, the application of the graphite to separator is not suitable in the economic efficiency aspect.

Meanwhile, as an alternate material to replace the graphite, carbon composites have been developed by injection-molding of carbon powder and resins. The carbon composite separators are more economical than the graphite separators. However, the carbon composites have disadvantages of low electrical conductivity and low mechanical strength.

As another separator material, metal alloy such as stainless steel can be used. Since metal has an excellent electrical conductivity and mechanical properties, and is easily processed and inexpensive, metal separator may satisfy the characteristics required for the separator. However, the prior metal separator has a problem that lifetime of the separator is short due to the corrosion of the metal.

SUMMARY OF THE INVENTION

Accordingly, the present invention has been made to solve the above-mentioned problems occurring in the prior art.

The object of the present invention is to provide a separator for a fuel cell using a metal plate coated with TiN, a method for manufacturing the same and a polymer electrolyte membrane fuel cell comprising the same, exhibiting an improved lifetime because there is no worry of corrosion of metal separator caused by electrolyte contrary to the prior metal separator, while satisfying the characteristics of an electrical conductivity and firmness, etc. required for the separator for the fuel cell The other aspect of the object of the invention is to provide a separator for a fuel cell using a metal plate coated with TiN, a method for manufacturing the same and a polymer electrolyte membrane fuel cell comprising the same, wherein the separator can be made thin, it is possible to increase the power density due to its small volume, the processing can be easily carried out and it is suitable for a mass production due to the inexpensive production cost, compared to the prior separator made of graphite.

In order to accomplish the above object, there is provided a separator for a fuel cell, wherein the separator is made of a metal plate coated with TiN.

In the separator according to the present invention, the separator consists of joined metal plates, wherein a cooling water flow field and a gas flow filed are respectively formed on both surfaces of the metal plate.

In the separator according to the present invention, the separator consists of the metal plate, wherein gas flow fields are respectively formed on both surfaces of the metal plate, and surfaces of the metal plate are coated with TiN.

In order to accomplish the above object, there is also provided a polymer electrolyte membrane fuel cell comprising the above separator.

In order to accomplish the above object, there is also provided a method for manufacturing a separator for a fuel cell, comprising steps of forming a gas flow field and a cooling water flow field on both surfaces of a metal plate, respectively (S1); joining two said metal plates on which the flow fields are formed (S2); and coating TiN on surfaces of the joined metal plates (S3).

In the method according to the present invention, the flow fields are formed on the metal plate by a chemical etching method in the step of S1.

In the method according to the present invention, the flow fields are formed on the metal plate by a stamping in the step of S1.

In the method according to the present invention, the two metal plates are joined by brazing with the cooling water flow fields being faced each other in the step of S2.

In the method according to the present invention, the TiN is coated on the surfaces by a hollow cathode discharge ion plating in the step of S3.

In order to accomplish the above object, there is also provided a method for manufacturing a separator for a fuel cell, comprising steps of forming gas flow fields on both surfaces of a metal plate, respectively (S1'); and coating TiN on surfaces of the metal plate (S3').

DETAILED DESCRIPTION OF THE INVENTION

Hereinafter, preferred embodiments of the present invention will be described with reference to the accompanying drawings. In the following description of the present invention, a detailed description of known functions and configurations incorporated herein will be omitted when it may make the subject matter of the present invention rather unclear.

The separator for a fuel cell according to the invention uses a metal plate coated with TiN as a separator material, contrary to the prior art. Accordingly, compared to the existing separator made of graphite, mechanical characteristics of the separator according to the invention are excellent, and it is possible to increase a volumetric power density, and to easily process and mass-produce the separator at low production cost. In addition, compared to the existing separator made of metal, durability is greatly increased, so that the lifetime is improved.

Firstly, a separator for a fuel cell using a metal plate coated with TiN and a method for manufacturing the same will be described.

As described above, a metal plate coated with TiN is applied to a separator for a fuel cell as a separator material, contrary to the prior method just using a metal plate.

Stainless steel, for example, a commercial 316 stainless steel can be used for the metal plate, on which the TiN is coated, according to the present invention. However, it is not limited to the stainless steel, and aluminum alloy, titanium alloy and nickel alloy, etc. may be used.

The separator may consist of joined metal plates, each of which is formed with a cooling water flow field and a gas flow field on both surfaces thereof. The metal plates are joined with the cooling water flow field being faced each other.

Meanwhile, when it is not required for a cooling water flow field, the separator may consist of a metal plate, which has gas flow fileds on both surfaces thereof.

A method for manufacturing a separator for a fuel cell using a metal plate, for example, stainless steel plate coated with TiN according to the invention is as follows.

Figure 1A:
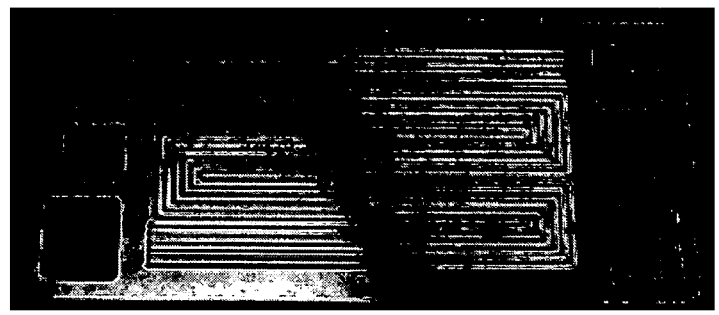
FIG. 1A is a photograph showing a surface of the stainless steel plate on which a gas flow filed is formed by a chemical etching method, according to an embodiment of the invention.
Figure 1B:
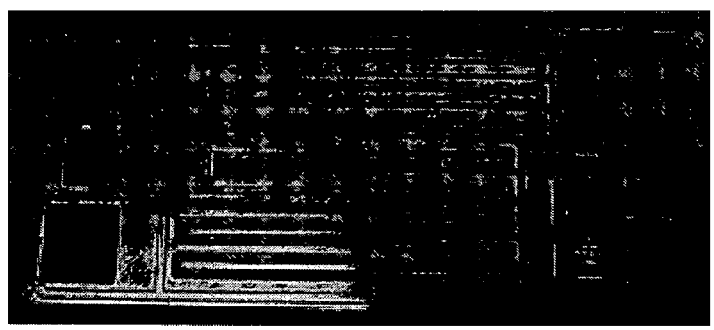
FIG. 1B is a photograph showing a surface of the stainless steel plate on which a cooling water flow filed is formed by a chemical etching method, according to an embodiment of the invention.
Figure 1C:
FIG. 1C is a photograph showing a separator prepared by brazing the two stainless steel plates having the flow fields as shown in FIGS. 1A and 1B formed on both surfaces thereof, respectively, with the surfaces having the cooling water flow fileds being faced each other, and then coating surfaces of the joined two stainless steel plates with TiN, according to an embodiment of the invention.

FIG. 1 are photographs showing each step for providing a separator for a fuel cell using stainless steel plate coated with TiN according to an embodiment of the invention. FIG. 1A is a photograph showing a surface of the stainless steel plate on which a gas flow filed is formed, FIG. 1B is a photograph showing a surface of the stainless steel plate on which a cooling water flow field is formed, and FIG. 1C is a photograph showing a separator prepared by brazing the two stainless steel plates having the flow fields as shown in FIGS. 1A and 1B formed on both surfaces thereof, respectively, with the surfaces having the cooling water flow fileds being faced each other, and then coating surfaces of the joined two stainless steel plates with TiN.

In the method for manufacturing a separator for a fuel cell using stainless steel plate coated with TiN according to the invention, a gas flow field is formed on a surface of stainless steel plate, as shown in FIG. 1A, and then a cooling water flow field is formed on another surface of the stainless steel plate, as shown in FIG. 1B (S1).

In addition, as described above, when it is not necessary to form the cooling water flow field, only the gas flow fields may be formed on both surfaces of the stainless steel plate, respectively (S1'). Further, the separator consists of the stainless steel plate, as described below.

Herein, the gas flow field or the cooling water flow field is formed on the stainless steel plate by a chemical etching method or by a stamping method (stamping a thin metal plate).

The gas flow field is shaped in the form of serpentine and may be shaped in the form of zigzag or straight. An inlet and an outlet for reacting gases are diagonally located. Hydrogen and oxygen, which are reacting gases, are supplied by counter flow.

As shown in FIG. 1C, the two stainless steel plates on which the flow fields are formed are joined by brazing. As described above, when the cooling water flow field is formed, the two stainless steel plates are brazed with the cooling water flow fields being faced each other (S2).

After that, TiN is coated on the surfaces of the joined steel plates by using a HCD (Hollow Cathode Discharge) ion plating (S3). Further, in case that the separator consists of the steel plate with gas flow fields on both surfaces thereof, TiN is coated on the surfaces of the steel plate by using a HCD ion plating (S3').

As described above, when the flow fields of the separator are formed by stamping a thin metal plate, the brazing and the TiN coating after forming the flow fields may be carried out in the same process as the case of using the stainless steel plates.

Hereinafter, a polymer electrolyte membrane fuel cell comprising the separator using a metal plate coated with TiN according to the invention will be described.

A polymer electrolyte membrane fuel cell comprising a separator using a metal plate coated with TiN according to the invention uses a separator for a fuel cell using the metal plate coated with TiN as a separator material, as described above.

That is, a separator may made of joined metal plates on which TiN is coated, each metal plate having a cooling water flow filed and a gas flow field formed respectively on both surfaces thereof. Further, a separator may be made of a metal plate on which TiN is coated, the metal plate having gas flow fields formed respectively on both surfaces thereof. Then MEA and a gasket are incorporated with the separator, so that a single cell of a polymer electrolyte membrane fuel cell is constructed.

EXAMPLE

<Preparation of a Separator Using Stainless Steel Plate Coated With TiN>

A separator using stainless steel plate coated with TiN is prepared by forming a gas flow field on a surface of a stainless steel plate (AISI 316, 1.5 mm) and a cooling water flow field on another surface of the stainless steel plate with a chemical etching method, brazing the two stainless steel plates with the cooling water flow fields being faced each other, and then coating the plates with TiN to have a thickness of 1 μm or more with a HCD ion plating method.

<Preparation of a Single Fuel Cell>

1: Preparation of MEA

Pt/C powders (electrochem or E-tech) consisting of 20 wt % Pt supported by carbon black (Vulcan XC-72R, Cabot) was used as a catalyst material for the electrodes. Carbon paper (TGPH-060) containing 20 wt % PTFE (Polytetrafluoroethylene) was used as a gas diffusion layer with hydrophobicity.

Catalyst ink for preparing the electrodes was prepared by dispersing Pt/C powder and Nafion ionomer in isopropyl alcohol (IPA) solution and applying an ultrasonic treatment to the ink for a uniform dispersion. The prepared catalyst ink was coated on the carbon paper using an air brush gun and then, ionomer diluted with IPA was sprayed on the catalytic layer, thereby forming the electrodes. Pt-loading was 0.4 and 0.7 mg/cm$^2$ for the anode and cathode, respectively.

The prepared anode and cathode were put on both sides of the previously treated Nafion 115 polymer electrolyte membrane and then hot-pressed, thereby providing MEA. At this time, the hot-pressing was performed at 140° C. under the pressure of 200 atm for 90 sec.

2: Preparation of a Single Cell

A single cell was fabricated by assembling the prepared MEA, silicone gaskets and the separator using stainless steel coated with TiN, prepared as described above.

<Preparation of a Fuel Cell Stack>

A 12-cells stack was manufactured by using the MEAs, the silicone gaskets and the stainless steel separators coated with TiN. In the stack, the separators having a cooling water flow field and the separators having gas flow fields on both surfaces thereof without the cooling water flow field were alternately used.

<Experiment 1>

An experiment was carried out to measure performances of the single cell and the stack prepared as described above.

An operating temperature of the single cell was 80° C., and stoichiometry of the reacting gases was 1.5 for hydrogen and 3 for oxygen. The gases were passed through bubbler-type humidifiers at 80° C. and then supplied to the fuel cell. The operating pressure was ambient pressure.

An operating temperature of the stack was 60° C., and stoichiometry of the reacting gases was 1.5 for hydrogen and 3 for oxygen. The gases were passed through bubbler-type humidifiers at 60° C., and then supplied to the fuel cell. The operating pressure was ambient pressure.

Temperature of the stack was controlled by flowing cooling water. Performance of the cell was evaluated by measuring current and voltage of the cell using an electronic load (Daegil electronics, EL 500P).

Figure 2:
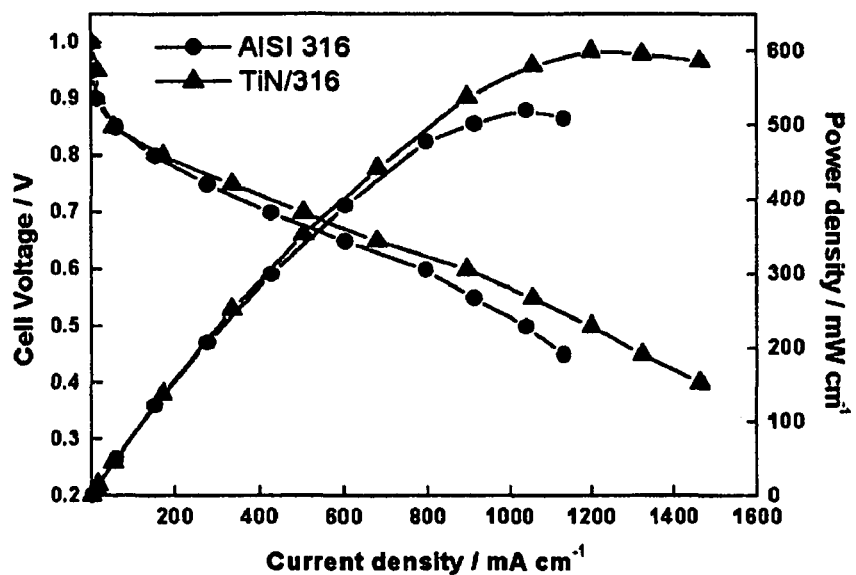
FIG. 2 is a graph comparing performances of a polymer electrolyte membrane fuel cell comprising a separator made of stainless steel plate coated with TiN according to an embodiment of the invention and a polymer electrolyte membrane fuel cell comprising a separator made of commercial stainless steel plate without TiN coating.

FIG. 2 is a graph comparing performances of a single cell using the separator made of stainless steel plate coated with TiN as described above and a single cell using a separator made of commercial 316 stainless steel.

As can be seen from FIG. 2, while the single cell using the separator without TiN-coating layer showed 796 $mA/cm^2$ at 0.6V, the single cell using the separator made of stainless steel plate coated with TiN showed improved performance of 896 $mA/cm^2$ at 0.6V.

Figure 3:
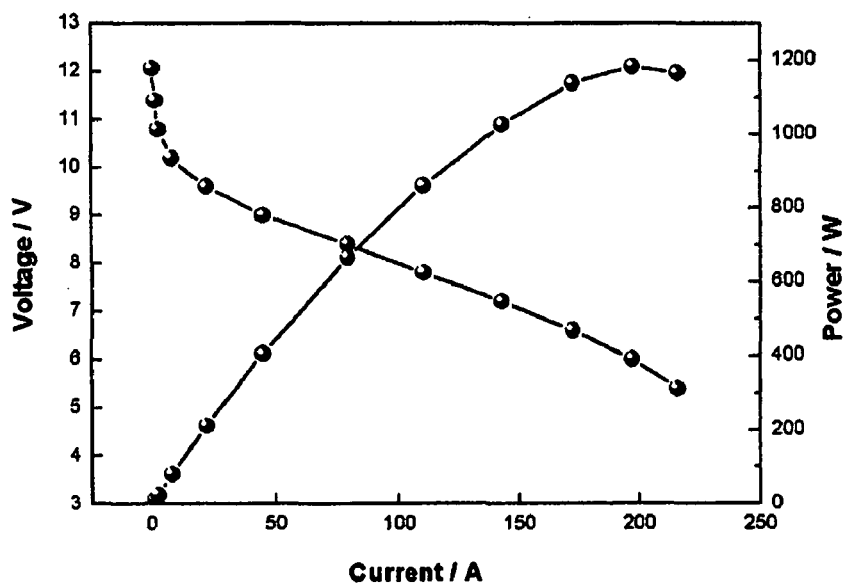
FIG. 3 is a graph showing performance of a polymer electrolyte membrane fuel cell stack having power of 1 kW prepared using a separator made of stainless steel plate coated with TiN according to an embodiment of the invention.

FIG. 3 is a graph showing a performance of the stack using the separator made of stainless steel coated with TiN.

As can be seen from FIG. 3, when a voltage of the stack was 6V, its output was 1.2 kW with 199.5 A (831.2 $mA/cm^2$).

Figure 4:
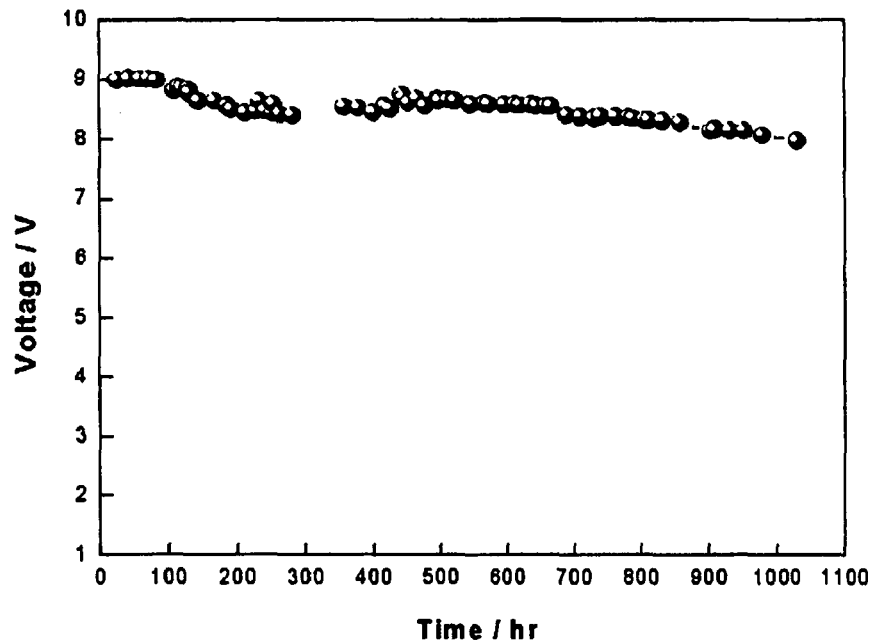
FIG. 4 is a graph showing long-term performance of a polymer electrolyte membrane fuel cell stack having power of 1 kW prepared using a separator made of stainless steel plate coated with TiN according to an embodiment of the invention.

FIG. 4 is a graph showing voltage change of the stack measured for 1,028 hours at a constant load of 48 A (200 $mA/cm^2$).

As can be seen from FIG. 4, voltage degradation rate of the stack was 11%/1,000 h, which was higher than the commercialization target of 3%/1,000 h.

Figure 5:
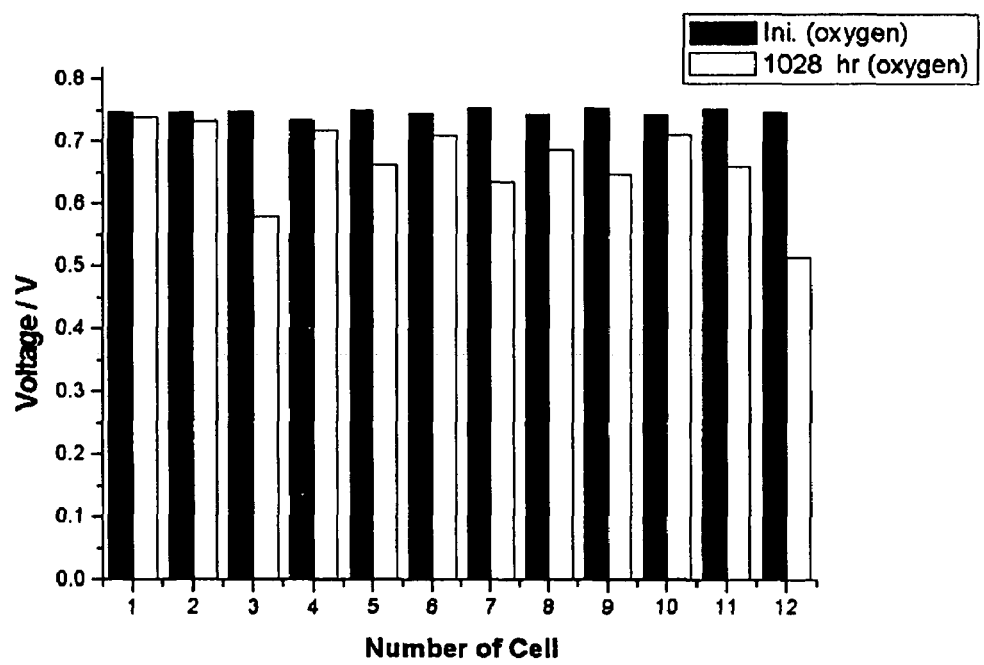
FIG. 5 is a graph comparing voltages of each single cell of a polymer electrolyte membrane fuel cell stack having a 1 kW of power prepared using a separator made of stainless steel plate coated with TiN according to an embodiment of the invention at the early stage of the operation and after the operation at 48 A for 1,028 hours.

FIG. 5 is a graph comparing voltages of the each single cell constituting the stack at the initial stage of the operation and after the operation for 1,028 hours.

As can be seen from FIG. 5, while No. 12 cell showed the highest voltage degradation rate of 30%/1,000 hrs., No. 1 cell showed the lowest voltage degradation rate of 1.2%/1,000 hrs., which was lower than the commercialization target.

As described above, according to the invention using a metal plate coated with TiN, the separator can be made to be thin and it is possible to increase the power density, compared to the prior separator made of graphite. At the same time, a proper level of physical strength can be maintained, so that there is no problem of a breakdown by an external shock. In addition, the flow field can be easily formed and the cost is low.

Further, the polymer electrolyte membrane fuel cell comprising the separator using a metal plate coated with TiN according to the invention has no problem of corrosion caused by the electrolyte, compared to the prior metal separator, so that the durability is excellent and the lifetime is long.

Furthermore, according to the invention, when a mass-production system is established, the flow fields are provided by stamping a thin metal plate, instead of forming the flow fields on the stainless steel plate by chemical etching, and then the two plates are brazed and coated with TiN, so that the weight of the stack can be reduced.

What is claimed is:

1. A separator for a fuel cell, comprising: brazed 316 series stainless steel plates, each plate having both a cooling water flow field and a gas flow field respectively formed on the surfaces thereof, wherein the cooling water flow field surfaces of the brazed stainless steel plates remain uncoated and face each other, wherein the gas flow field surfaces of the brazed stainless steel plates face away from each other and are coated with TiN, and the cooling water flows to the middle of the separator, between the cooling water flow fields of each plate.

2. A polymer electrolyte membrane fuel cell, comprising: brazed 316 series stainless steel plates, each plate having, both a cooling water flow field and a gas flow field respectively formed on the surfaces thereof, wherein the cooling water flow field surfaces of the joined stainless steel plates remain uncoated and face each other, wherein the gas flow field surfaces of the brazed stainless steel plates face away from each other and are coated with TiN, and the cooling water flows to the middle of the separator, between the cooling water flow fields of each plate.

3. A method for manufacturing a separator for a fuel cell, comprising steps of:
    forming a cooling water flow field and a gas flow field on each surface of a plurality of 316 series stainless steel plate respectively;
    joining two 316 series stainless steel plates by brazing with cooling water flow fields facing each other;
    coating TiN on the gas flow field surfaces of the brazed stainless steel plates facing away from each other; wherein the cooling water flow field surfaces of the two joined stainless steel plates remain uncoated and face each other, and wherein the cooling water flows to the middle of the separator, between the cooling water flow fields of each plate.

4. The method according to claim 3, wherein forming flow fields on the stainless steel plate is achieved by a chemical etching method.

5. The method according to claim 3, wherein forming flow fields on the stainless steel is achieved by stamping.

6. The method according to claim 3, wherein coating TiN on the surfaces of the joined stainless steel plates is achieved by hollow cathode discharge ion plating.

\* \* \* \* \*